(12) United States Patent
Fujikawa et al.

(10) Patent No.: US 8,011,624 B2
(45) Date of Patent: Sep. 6, 2011

(54) STAND ATTACHMENT STRUCTURE

(75) Inventors: Akihiro Fujikawa, Osaka (JP);
Shinichiro Sakamoto, Osaka (JP); Yuki Ogaki, Osaka (JP); Hideo Yonezawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 124 days.

(21) Appl. No.: 12/557,566

(22) Filed: Sep. 11, 2009

(65) Prior Publication Data
US 2010/0072867 A1   Mar. 25, 2010

(30) Foreign Application Priority Data
Sep. 22, 2008 (JP) .................. 2008-241904

(51) Int. Cl.
*F16M 11/20* (2006.01)

(52) U.S. Cl. ............... 248/188.1; 248/688; 248/371; 248/176.1; 248/188.8; 248/346.01; 248/346.03; 248/121; 248/917; 248/918; 248/923; 248/125.7; 248/676; 248/678; 248/176.3; 361/679.21; 361/679.22

(58) Field of Classification Search .............. 248/688, 248/127, 371, 176.1, 188.1, 188.8, 188.9, 248/188.91, 346.01, 346.03, 121, 917, 918, 248/923, 177.1, 125.7, 676, 678, 466, 481, 248/185, 176.3; 361/679.21, 679.22, 679.27
See application file for complete search history.

(56) References Cited

U.S. PATENT DOCUMENTS
| | | | | |
|---|---|---|---|---|
| 7,651,062 B2 * | 1/2010 | Matsutani et al. | ......... | 248/176.3 |
| 7,744,045 B2 * | 6/2010 | Akagawa et al. | ............. | 248/121 |
| 2007/0210220 A1 * | 9/2007 | Sawai et al. | ................ | 248/122.1 |

FOREIGN PATENT DOCUMENTS
| | | |
|---|---|---|
| EP | 1 617 314 A2 | 1/2006 |
| JP | 2008-129390 A | 6/2008 |

* cited by examiner

*Primary Examiner* — Nkeisha Smith
(74) *Attorney, Agent, or Firm* — Global IP Counselors

(57) ABSTRACT

A stand attachment structure includes a front cabinet, a rear cabinet and a pair of screws. The front cabinet has a pair of right and left bosses and a holder support. The holder support is formed on an outer peripheral face of each of the bosses at a location spaced from a distal end face of each of the bosses by thickness of a tilting stand holder of a tilting stand. The rear cabinet has a pair of right and left retainers. The retainers are formed at locations opposite the bosses of the front cabinet. Each of the retainers has an end face and a screw insertion hole that is formed on the end face. The screws are disposed through the screw insertion holes of the retainers and threaded into the threaded holes of the bosses to fasten the rear cabinet to the front cabinet.

6 Claims, 7 Drawing Sheets

STAND ATTACHMENT STRUCTURE

CROSS-REFERENCE TO RELATED APPLICATIONS

This application claims priority to Japanese Patent Application No. 2008-241904, filed on Sep. 22, 2008. The entire disclosure of Japanese Patent Application No. 2008-241904 is hereby incorporated herein by reference.

BACKGROUND OF THE INVENTION

1. Field of the Invention

The present invention generally relates to a stand attachment structure. More specifically, the present invention relates to a stand attachment structure for an electronic device.

2. Background Information

With a conventional stand attachment structure for a flat panel display device, bosses are formed protruding rearward from a rear face of a front cabinet. Mating components that mate with the bosses by surrounding the bosses are provided to the display panel. A support component of a tilting stand is sandwiched between the mating components and the rear cabinet. Screws are passed through the mating components of the display panel and the support component of the rear cabinet and threaded into the bosses to fasten everything together (see Japanese Laid-Open Patent Application Publication No. 2008-129390, for example).

The conventional stand attachment structure does not need attachment pieces for preventing distortion of the display panel. However, the conventional stand attachment structure is designed just for attaching the tilting stand, and is not designed for attaching a fixed stand with different support component shapes and so forth.

In view of the above, it will be apparent to those skilled in the art from this disclosure that there exists a need for an improved stand attachment structure. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a stand attachment structure for an electronic device with which a fixed stand and a tilting stand can be selectively attached to the electronic device.

In accordance with one aspect of the present invention, a stand attachment structure for selectively attaching one of a fixed stand with a fixed stand holder and a tilting stand with a tilting stand holder and a stand hinge to an electronic device includes a front cabinet, a rear cabinet and a pair of screws. The front cabinet has a pair of right and left bosses and a holder support. The bosses are formed on a lower rear face of the front cabinet and protrude rearward of the front cabinet relative to the lower rear face of the front cabinet. Each of the bosses has a threaded hole. The holder support has a support face. The holder support is formed on an outer peripheral face of each of the bosses at a location spaced from a distal end face of each of the bosses by thickness of the tilting stand holder of the tilting stand. The rear cabinet is fixedly coupled to the front cabinet. The rear cabinet has a pair of right and left retainers, an opening and an insertion opening. The retainers are formed on a lower part of the rear cabinet at locations opposite the bosses of the front cabinet. Each of the retainers has an end face and a screw insertion hole that is formed on the end face. The opening is formed on the lower part of the rear cabinet and is arranged to allow a convex part of the fixed stand holder of the fixed stand to protrude rearward of the rear cabinet when the fixed stand is attached to the electronic device. The insertion opening is formed on the lower part of the rear cabinet. The stand hinge of the tilting stand is inserted through the insertion opening when the tilting stand is attached to the electronic device. The screws are disposed through the screw insertion holes of the retainers and threaded into the threaded holes of the bosses to fasten the rear cabinet to the front cabinet.

With the stand attachment structure of the present invention, it is possible to provide a stand attachment structure for an electronic device with which a fixed stand and a tilting stand can be selectively attached to the electronic device.

These and other objects, features, aspects and advantages of the present invention will become apparent to those skilled in the art from the following detailed descriptions, which, taken in conjunction with the annexed drawings, disclose a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from these disclosures that the following descriptions of the preferred embodiment of the present invention are provided for illustration only and not for the purpose of limiting the invention as defined by the appended claims and their equivalents.

With a stand attachment structure shown in FIGS. 1 to 7, a fixed stand S1 is attached via a fixed stand holder 3 to a lower part of a cabinet C of a liquid crystal television set, and a tilting stand S2 is attached to the lower part of the cabinet C via a tilting stand holder 4 and a stand hinge 5.

Figure 1:
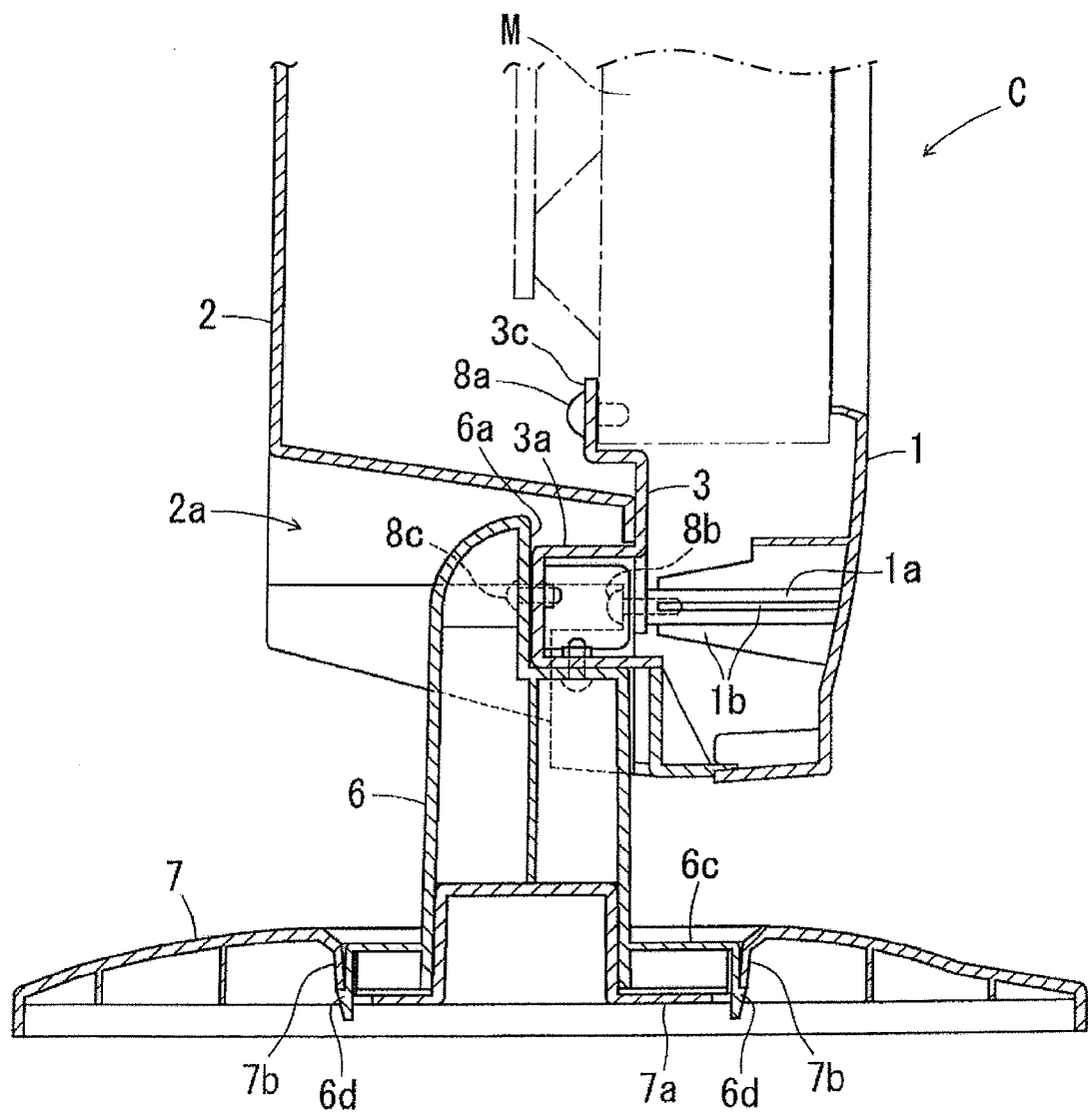
FIG. 1 is a side elevational cross sectional view of a stand attachment structure in accordance with one embodiment of the present invention illustrating a state in which a fixed stand is attached to a cabinet via a fixed stand holder.

As shown in FIG. 1, the cabinet C of a liquid crystal television set includes a front cabinet 1 and a rear cabinet 2. The cabinet C is made of synthetic resin. A liquid crystal module M is positioned and attached behind a front opening of the front cabinet 1 on an inside of the cabinet C defined between the front cabinet 1 and the rear cabinet 2. The front cabinet 1 and the rear cabinet 2 are separably joined by fastening their four corners and lower wall parts with screws, and engaging a plurality of engagement protrusions (hooks) formed on a rear ends of upper and side walls of the front cabinet 1 in a plurality of engagement holes formed at a front ends of upper and side walls of the rear cabinet 2, respectively.

Figure 5:
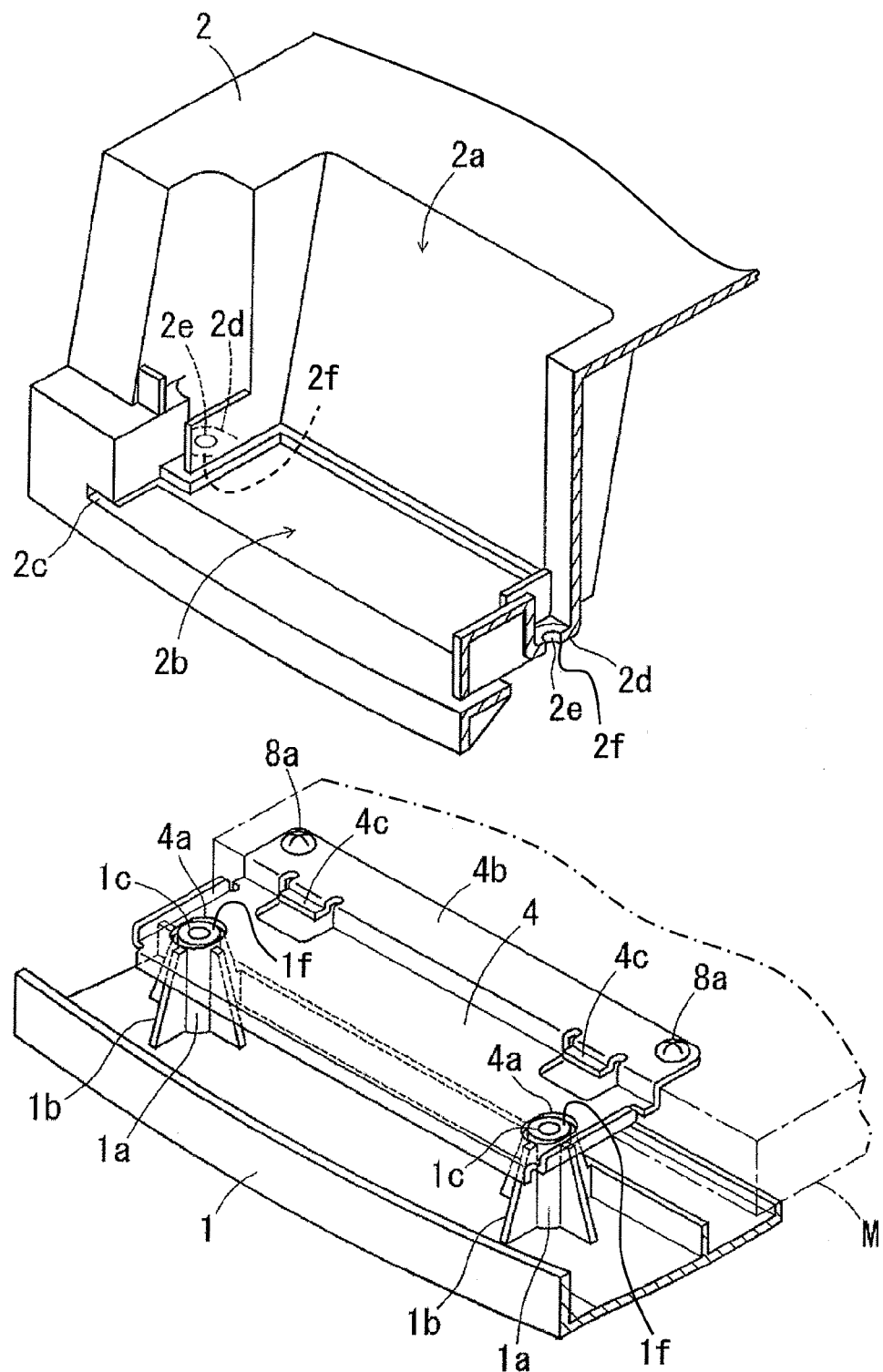
FIG. 5 is a detailed perspective view of the stand attachment structure illustrating a method for attaching a tilting stand.
Figure 7:
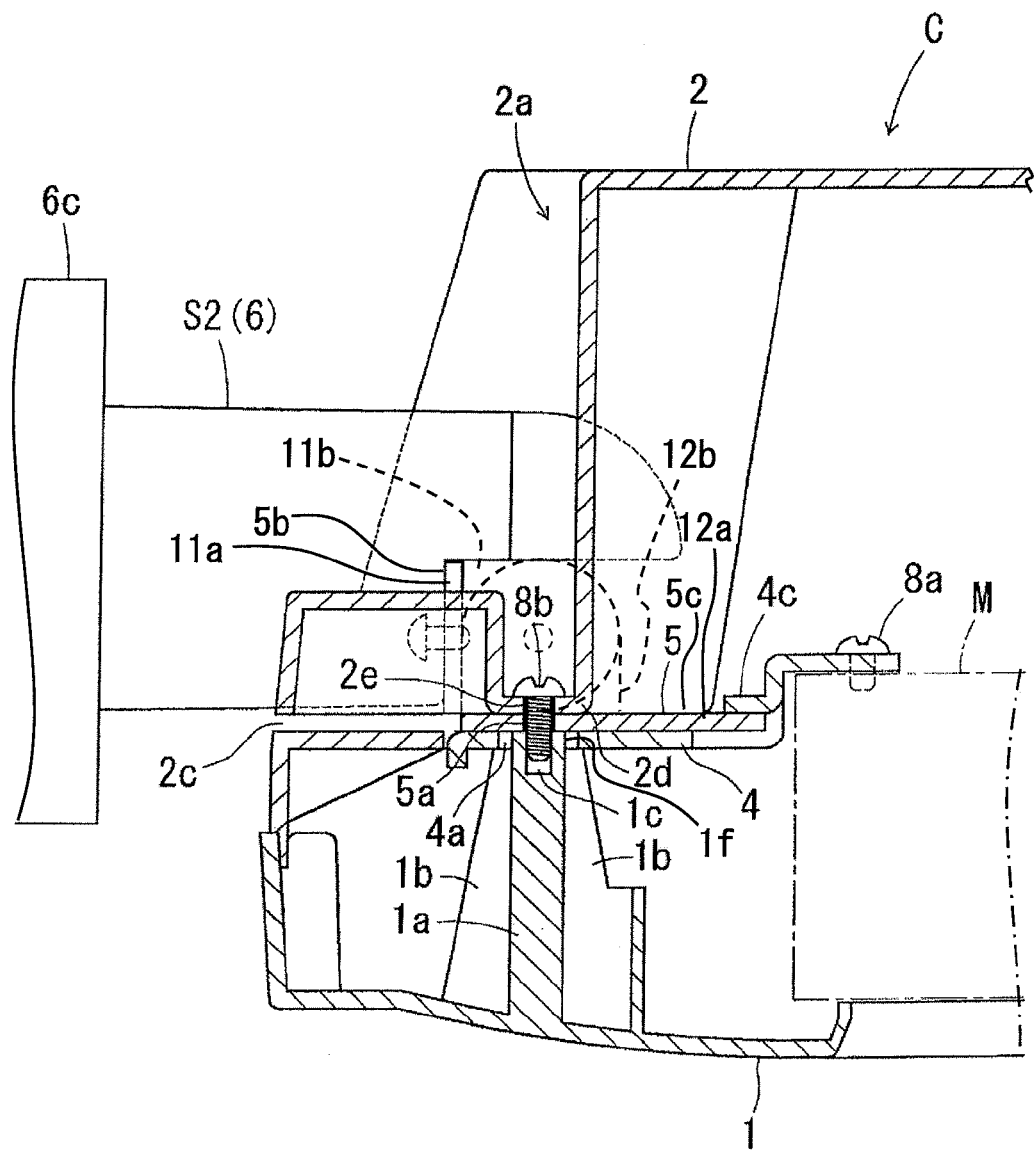
FIG. 7 is a detailed cross sectional view of the stand attachment structure taken along VII-VII line in FIG. 6 illustrating a state in which the tilting stand is attached to the cabinet via a tilting stand holder and a stand hinge.

A pair of right and left bosses 1a is formed on a lower rear face of the front cabinet 1. The bosses 1a protrude rearward from the lower rear face of the front cabinet 1. Several (four, for example) rib pieces 1b are formed as holder supports on an outer peripheral face of each of the bosses 1a. As shown in FIGS. 5 and 7, the rib pieces 1b are formed lowered down from distal end faces 1e of distal end portions 1f of the bosses 1a by the thickness of right and left end portions of the tilting stand holder 4, respectively. The tilting stand holder 4 is made of sheet metal. A distal end face (e.g., upper end face) of each of the rib pieces 1b is a flat face that is perpendicular to respective one of the bosses 1a, so that the tilting stand holder 4 can be stably supported when the tilting stand holder 4 is placed on the rib pieces 1b. Specifically, when the distal end portions 1f of the bosses 1a are loosely fitted into holes 4a formed in the right and left end portions of the tilting stand holder 4, since the holes 4a are slightly larger than the bosses 1a, the tilting stand holder 4 is supported by the rib pieces 1b. Furthermore, a surface (an upper face) of the tilting stand holder 4 is located in the same plane as the distal end faces 1e of the bosses 1a. It is also possible for the holder supports to be flanges, for example, formed instead of the rib pieces 1b. However, if the rib pieces 1b are formed as the holder supports, an advantage is that the reinforcing action of the rib pieces 1b will increase the strength of the bosses 1a.

Figure 2:
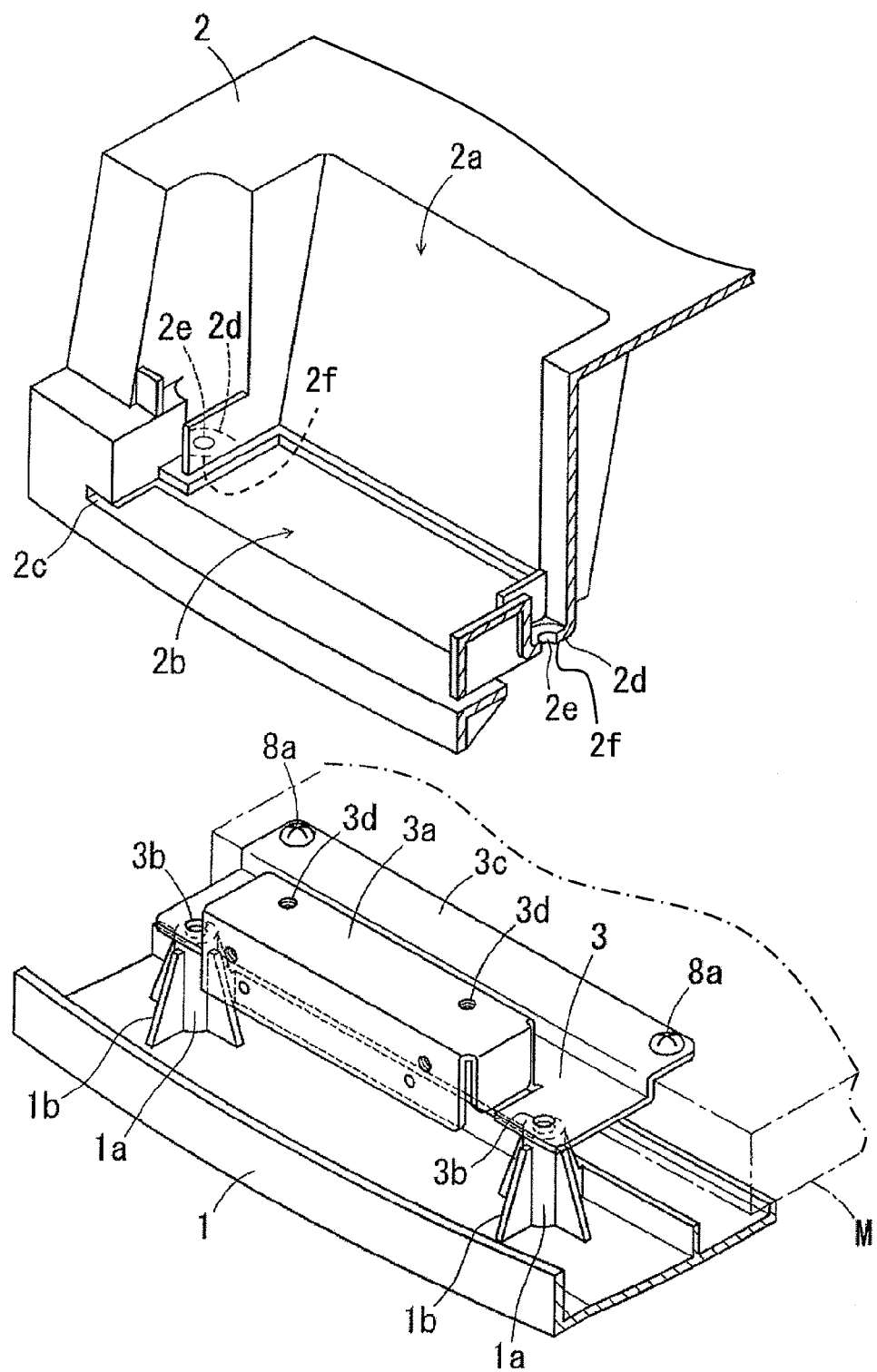
FIG. 2 is a detailed perspective view of the stand attachment structure illustrating a method for attaching the fixed stand.
Figure 3:
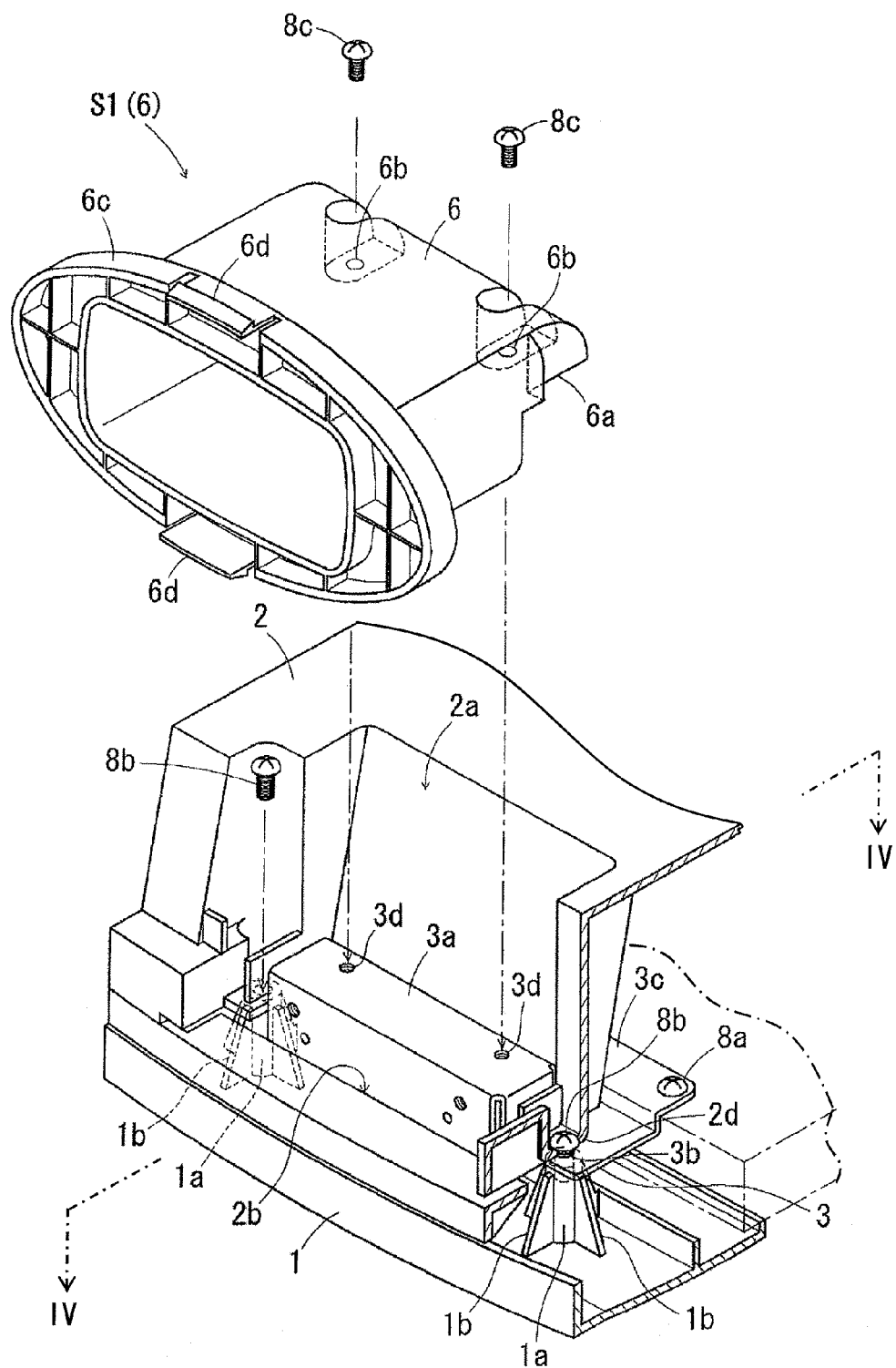
FIG. 3 is a detailed perspective view of the stand attachment structure illustrating the method for attaching the fixed stand.
Figure 4:
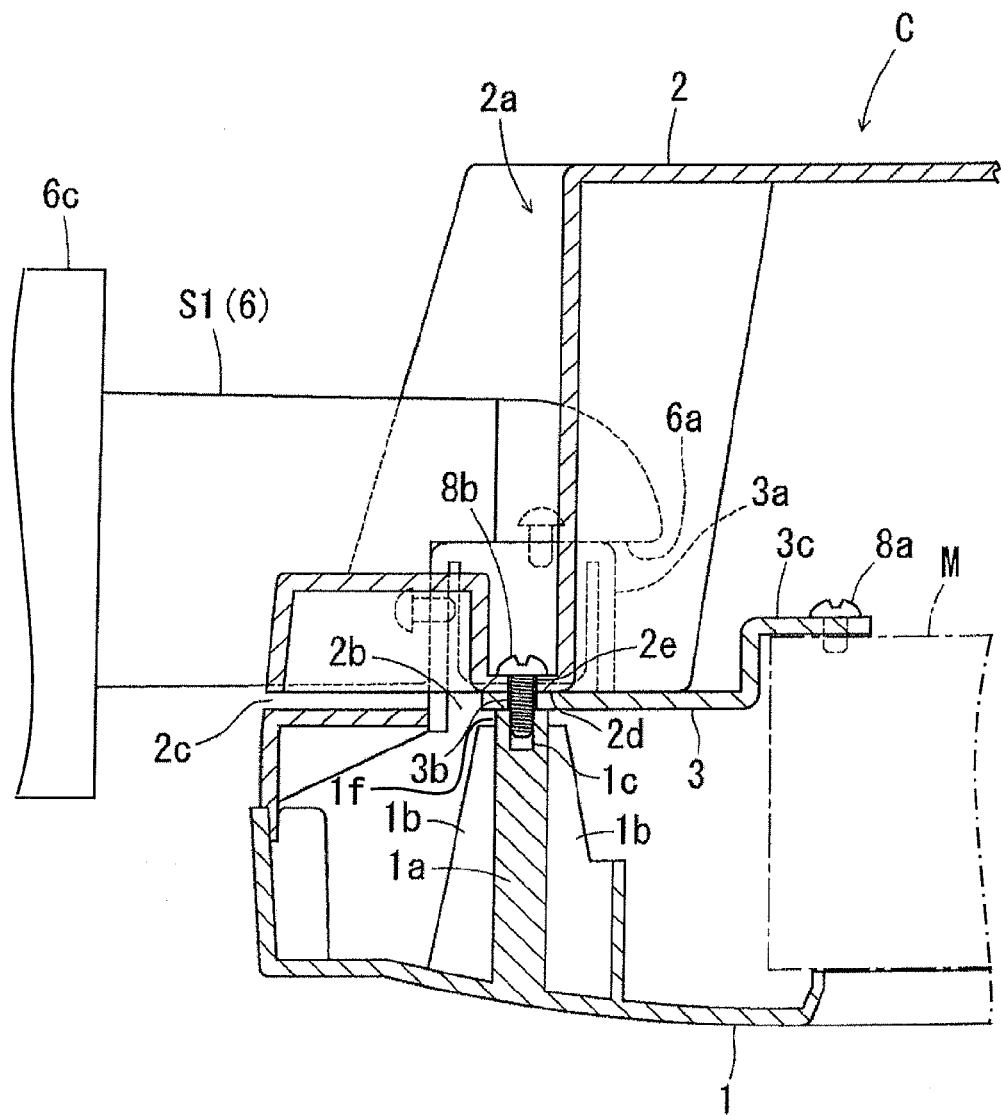
FIG. 4 is a detailed cross sectional view of the stand attachment structure taken along IV-IV line in FIG. 3.

Meanwhile, as shown in FIGS. 1-4, the rear cabinet 2 further has a holding recess 2a, an opening 2b and an insertion opening 2c that are formed in the lower part of the rear cabinet 2. The holding recess 2a holds a neck 6 of the fixed stand S1 or the tilting stand S2. The opening 2b allows a convex part 3a of the fixed stand holder 3 that is made of sheet metal to protrude outward of the cabinet C. The stand hinge 5 that is made of sheet metal is inserted in the insertion opening 2c. As shown in FIG. 2, a pair of right and left retainers 2d is formed on right and left ends of the opening 2b, opposite the bosses 1a of the front cabinet 1. Each of the retainers 2d includes an end face (e.g., front end face) 2f and a screw insertion hole 2e formed on the end face 2f. As shown in FIGS. 4 and 7, when the front cabinet 1 and the rear cabinet 2 are joined, there is just enough of a gap between the distal end faces 1e of the bosses 1a and the end face 2f of the retainers 2d to allow the right and left end portions of the fixed stand holder 3 to be sandwiched, or right and left end portions of the stand hinge 5 to be inserted and sandwiched.

As shown in FIG. 2, when the fixed stand S1 is attached to the lower part of the cabinet C via the fixed stand holder 3, a pair of screw insertion holes 3b formed in the right and left end portions of the fixed stand holder 3 is aligned with the bosses 1a of the front cabinet 1. Furthermore, the right and left end portions of the fixed stand holder 3 are superposed with the bosses 1a. Then, a stepped distal end part 3c of the fixed stand holder 3 is superposed with a rear frame of the liquid crystal module M, and two lateral end portions of the stepped distal end part 3c are fixed to the rear frame with screws 8a.

Next, as shown in FIG. 3, the rear cabinet 2 is placed over and joined to the front cabinet 1. Specifically, as shown in FIGS. 3 and 4, the right and left end portions of the fixed stand holder 3 are sandwiched between the distal end faces 1e of the bosses 1a of the front cabinet 1 and the end faces 2f of the retainers 2d of the rear cabinet 2, respectively. The convex part 3a of the fixed stand holder 3 is allowed to protrude outward of the cabinet C from the opening 2b formed in the rear cabinet 2. Fastening screws 8b are then passed from the screw insertion holes 2e formed in the retainers 2d and through screw insertion holes 3b formed in the right and left end portions of the fixed stand holder 3, and threaded into screw holes 1c formed in the bosses 1a. As a result, the retainers 2d, the right and left end portions of the fixed stand holder 3, and the bosses 1a are fastened together, and the fixed stand holder 3 is fixed to the cabinet C.

Finally, the neck 6 of the fixed stand S1 is placed in the holding recess 2a from behind the rear cabinet 2. Then, a distal end stepped part 6a of the neck 6 is superposed with the convex part 3a of the fixed stand holder 3. Screws 8c are inserted from screw insertion holes 6b formed in the distal end stepped part 6a, and threaded into screw holes 3d formed on the convex part 3a. As a result, the neck 6 of the fixed stand S1 is fixed to the convex part 3a of the fixed stand holder 3, which completes the attachment of the fixed stand S1 to the lower part of the cabinet C.

Figure 6:
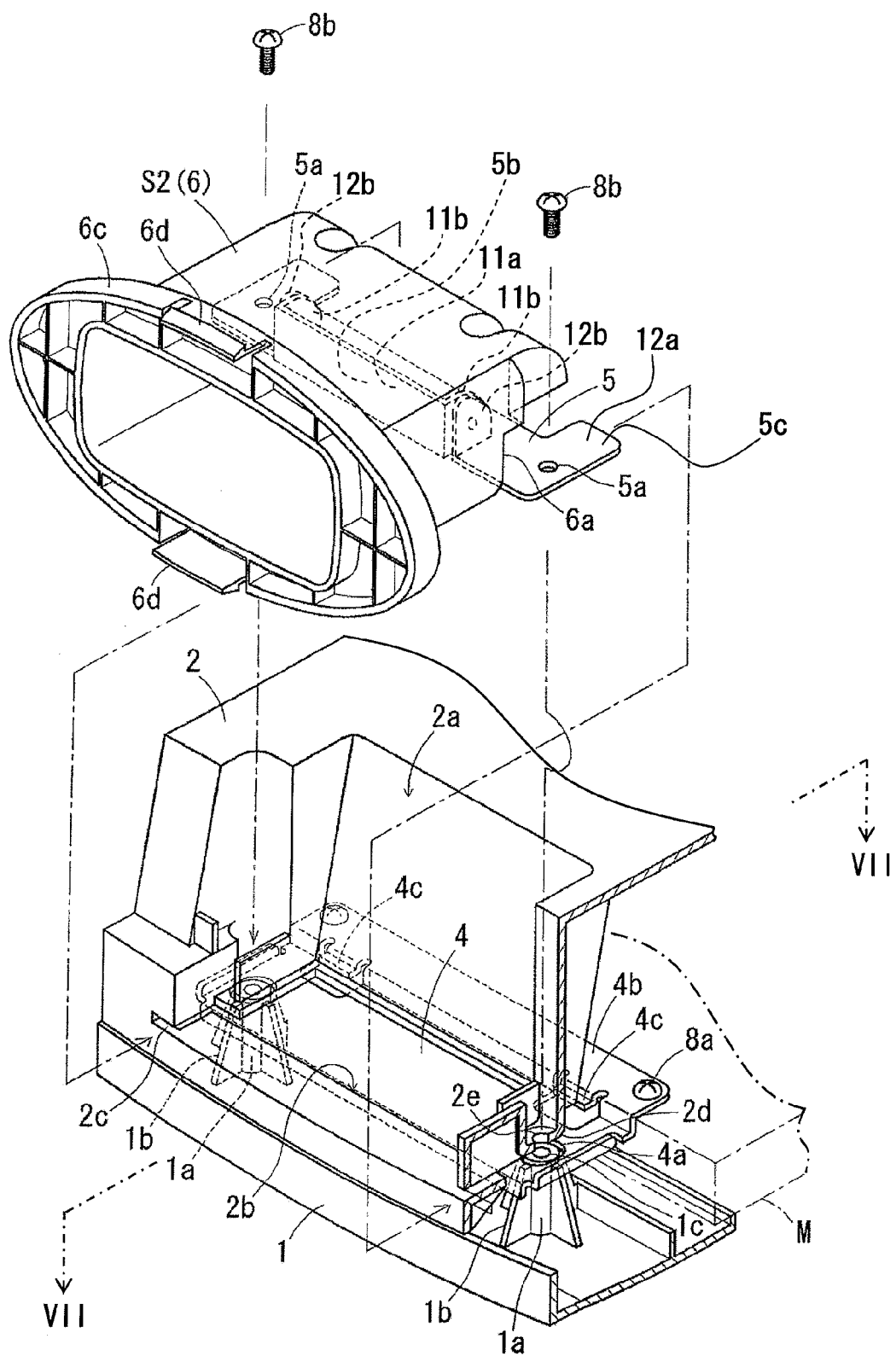
FIG. 6 is a detailed perspective view of the stand attachment structure illustrating the method for attaching the tilting stand.

As shown in FIG. 1, the fixed stand S1 has a base 7 with the neck 6 and the base 7 being made of a synthetic resin. Furthermore, as shown in FIG. 3, a pair of front and rear hooks 6d is formed on a base component 6c of the neck 6. As shown in FIG. 1, the base component 6c of the neck 6 is fitted into a fitting recess 7a formed in a center portion of the base 7. The hooks 6d are engaged with engagement tabs 7b formed on a side face of the fitting recess 7a, respectively. Furthermore, as seen in FIGS. 6 and 7, the tilting stand S2 also has the same structure. Specifically, the tilting stand S2 also has the neck 6 and the base 7.

Meanwhile, as shown in FIG. 5, when the tilting stand S2 is attached to the lower part of the cabinet C via the tilting stand holder 4 and the stand hinge 5, the distal end portions 1f (upper end portions) of the bosses 1a of the front cabinet 1 are loosely fitted into the holes 4a of the tilting stand holder 4. The holes 4a are slightly larger than the distal end portions 1f of the bosses 1a and are formed in the right and left end portions of the tilting stand holder 4. The tilting stand holder 4 is directly supported by the four rib pieces 1b formed on each of the outer peripheral faces of the bosses 1a. A stepped distal end part 4b of the tilting stand holder 4 is superposed with the rear frame of the liquid crystal module M, and two lateral end portions of the stepped distal end part 4b are fixed to the rear frame with the screws 8a. As a result, the attachment position of the tilting stand holder 4 is lowered by the thickness of the tilting stand holder 4 relative to the distal end faces 1e of the distal end portions 1f of the bosses 1a, and the surface (upper face) of the tilting stand holder 4 is located in the same plane as the distal end faces 1e of the bosses 1a.

Next, as shown in FIG. 6, the rear cabinet 2 is placed over and joined to the front cabinet 1. The stand hinge 5 is pivotally fixed with screws to the distal end stepped part 6a of the neck 6 of the tilting stand S2.

Specifically, as shown in FIGS. 6 and 7, the stand hinge 5 includes a first portion 5b and a second portion 5c. The first portion 5b is fixedly attached to the distal end stepped part 6a of the tilting stand S2. The first portion 5b has a base plate 1a and a pair of right and left tabs 11b. The base plate 11a is fixedly coupled to an upper face of the distal end stepped part 6a of the tilting stand S2 with screws. The tabs 11b extend upward of the tilting stand S2 relative to the base plate 11a. The tabs 11b are formed by bending left and right end portion of the base plate 11a upward. Each of the tabs 11b includes a hole. The second portion 5c is pivotally coupled to the first portion 5b. The second portion 5c includes a base plate 12a and a pair of right and left tabs 12b. The base plate 12a includes a pair of screw insertion holes 5a in the right and left end portions of the base plate 12a. The tabs 12b extend rearward of the tilting stand S2 relative to the base plate 12a. The tabs 12b are formed by making cut portions on the base plate 12a and bending the cut portions rearward. Each of the tabs 12b includes a hole. The tabs 11b of the first portion 5b are superposed with the tabs 12b of the second portion 5c, respectively, so that the holes of the tabs 11b are aligned with the holes of the tabs 12b, respectively. Then, the tabs 11b and 12b are pivotally coupled with rivets so that the second portion 5c can pivot relative to the first portion 5b about a pivot axis extending through the holes of the tabs 11b and 12b.

The second portion 5c of the stand hinge 5 is inserted through a insertion opening 2c formed in the lower part of the rear cabinet 2 into the rear cabinet 2 so that the stand hinge 5 is superposed with the tilting stand holder 4 as shown in FIG. 7. The right and left end portions of the second portion 5c of the stand hinge 5 are sandwiched between the bosses 1a of the front cabinet 1 and the retainers 2d of the rear cabinet 2, respectively. Distal end portions in an insertion direction of the right and left end portions of the stand hinge 5 are held down by a pair of right and left retainer pieces 4c formed at a stepped part of the tilting stand holder 4. As a result, an upper half of the neck 6 of the tilting stand S2 is held in the holding recess 2a of the rear cabinet 2.

Then, the fastening screws 8b are passed from the screw insertion holes 2e in the retainers 2d and through the screw insertion holes 5a in the right and left end portions of the stand hinge 5, and threaded into the screw holes 11c formed in the bosses 1a. As a result, the retainers 2d, the right and left end portions of the stand hinge 5, the tilting stand holder 4, and the bosses 1a are fastened together, which completes the attachment of the neck 6 of the tilting stand S2 to the lower part of the cabinet C.

With the stand attachment structure, when the rear cabinet 2 has been placed over and joined to the front cabinet 1, there is just enough of the gap to allow the right and left end portions of the fixed stand holder 3 to be sandwiched between the bosses 1a of the front cabinet 1 and the retainers 2d of the rear cabinet 2. Specifically, the width of the gap is the same as the thickness of the fixed stand holder 3 (or the stand hinge 5). Thus, the neck 6 of the fixed stand S1 is attached with just a single fixed stand holder 3. Furthermore, between the bosses 1a and the retainers 2d, there is no enough gap for inserting both the tilting stand holder 4 and the stand hinge 5. However, the rib pieces 1b (holder supports) are formed on the outer peripheral faces of the bosses 1a, lowered down from the distal end faces 1e of the distal end portions 1f of the bosses 1a by the thickness of the right and left end portions of the tilting stand holder 4. Therefore, when the neck 6 of the tilting stand S2 is attached by using the tilting stand holder 4 and the stand hinge 5, the distal end portions 1f of the bosses 1a are loosely fitted into the holes 4a that are slightly larger than the bosses 1a and are formed in the right and left end portions of the tilting stand holder 4, so that the tilting stand holder 4 is supported by the rib pieces 1b. In other words, the tilting stand holder 4 is attached at a position that is lowered down by the thickness thereof relative to the distal end faces 1e of the bosses 1a. Furthermore, the stand hinge 5 is superposed with the tilting stand holder 4, the right and left end portions of the stand hinge 5 are sandwiched between the bosses 1a and the retainers 2d, and the pieces can be fastened together and attached with the fastening screws 8b. Thus, with the stand attachment structure, the fixed stand S1 can be attached with a single fixed stand holder 3, and the tilting stand S2 can be attached with two parts, namely, the tilting stand holder 4 and the stand hinge 5, without modifying the shape of stand attachment portions (e.g., the bosses 1a and the retainers 2d) of the front cabinet 1 and the rear cabinet 2. Thus, when the fixed stand S1 is attached, the stand attachment structure does not need two fixed hinge members to attach the fixed stand S1 to the lower part of the cabinet C, and only requires the fixed stand holder 3. Thus, the number of parts for attaching the fixed stand S1 to the cabinet C can be reduced by one, and the cost can be correspondingly lowered.

Also, with the stand attachment structure, both the fixed stand holder 3 and the tilting stand holder 4 are fixed to the rear frame of the liquid crystal module M at the stepped distal end part 3c or 4b thereof. Thus, compared to when the fixed stand holder 3 and the tilting stand holder 4 are fixed with just the fastening screws 8b, the fixing strength of the fixed stand holder 3 or tilting stand holder 4 can be increased, and this reduces looseness. Furthermore, since the retainer pieces 4c are formed on the tilting stand holder 4 so that the right and left end portions of the stand hinge 5 are held down by the retainer pieces 4c, the stand hinge 5 can be fixed by the retainer pieces 4c and the fastening screws 8b. Thus, there is less looseness in the stand hinge 5 than when it is fixed with just the fastening screws 8b.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal television set equipped with the present invention. Accordingly, these terms, as utilized to describe the present invention should be interpreted relative to a liquid crystal television set equipped with the present invention as used in the normal operating position.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:
1. A stand attachment structure for selectively attaching one of a fixed stand with a fixed stand holder and a tilting stand with a tilting stand holder and a stand hinge to an electronic device, the stand attachment structure comprising:
    a front cabinet including
        a pair of right and left bosses that is formed on a lower rear face of the front cabinet and protrudes rearward of the front cabinet relative to the lower rear face of the front cabinet, each of the bosses having a threaded hole, and a holder support with a support face that is formed on an outer peripheral face of each of the bosses at a location spaced from a distal end face of each of the bosses by thickness of the tilting stand holder of the tilting stand;

a rear cabinet fixedly coupled to the front cabinet, the rear cabinet including a pair of right and left retainers that is formed on a lower part of the rear cabinet at locations opposite the bosses of the front cabinet, each of the retainers having an end face and a screw insertion hole that is formed on the end face, an opening that is formed on the lower part of the rear cabinet and is arranged to allow a convex part of the fixed stand holder of the fixed stand to protrude rearward of the rear cabinet when the fixed stand is attached to the electronic device, and an insertion opening that is formed on the lower part of the rear cabinet and through which the stand hinge of the tilting stand is inserted when the tilting stand is attached to the electronic device; and a pair of screws disposed through the screw insertion holes of the retainers and threaded into the threaded holes of the bosses to fasten the rear cabinet to the front cabinet.

2. The stand attachment structure according to claim 1, wherein the distal end faces of the bosses of the front cabinet and the end faces of the retainers of the rear cabinet sandwich right and left end portions of the fixed stand holder of the fixed stand therebetween, respectively, when the fixed stand is attached to the electronic device, and the screws are further disposed through screw insertion holes of the right and left end portions of the fixed stand holder when the fixed stand is attached to the electronic device.

3. The stand attachment structure according to claim 1, wherein distal end portions of the bosses of the front cabinet are disposed through holes that are formed in right and left end portions of the tilting stand holder, and that are larger than the bosses when the tilting stand is attached to the electronic device, the support faces of the holder supports of the front cabinet directly support peripheral edge portions of the holes of the tilting stand holder when the tilting stand is attached to the electronic device, the distal end faces of the bosses of the front cabinet and the end faces of the retainers of the rear cabinet sandwich right and left end portions of the stand hinge that are inserted from the insertion opening of the rear cabinet, and that are superposed with the tilting stand holder, respectively, when the tilting stand is attached to the electronic device, and the screws are further disposed through screw insertion holes of the right and left end portions of the stand hinge when the tilting stand is attached to the electronic device.

4. The stand attachment structure according to claim 1, wherein each of the holder supports of the front cabinet includes a plurality of rib pieces that is formed on the outer peripheral face of each of the bosses of the front cabinet.

5. The stand attachment structure according to claim 1, wherein the tilting stand holder of the tilting stand includes a pair of right and left retainer pieces that is engaged with the right and left end portions of the stand hinge.

6. The stand attachment structure according to claim 1, wherein the electronic device includes a liquid crystal module with a rear frame that is disposed within an inside space defined between the front cabinet and the rear cabinet, one of the fixed stand holder of the fixed stand and the tilting stand holder of the tilting stand being further fixed to the rear frame of the liquid crystal module.

* * * * *